(12) United States Patent
Kim et al.

(10) Patent No.: US 7,973,872 B2
(45) Date of Patent: Jul. 5, 2011

(54) BACKLIGHT UNIT AND LIQUID CRYSTAL DISPLAY USING THE SAME

(75) Inventors: Minseop Kim, Paju-si (KR); Jinseo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 483 days.

(21) Appl. No.: 12/257,642

(22) Filed: Oct. 24, 2008

(65) Prior Publication Data

US 2009/0207334 A1    Aug. 20, 2009

(30) Foreign Application Priority Data

Feb. 15, 2008    (KR) .................. 10-2008-0014196

(51) Int. Cl.
*G02F 1/1333*    (2006.01)
(52) U.S. Cl. ............. 349/58; 349/65; 349/62; 362/97.2; 362/633
(58) Field of Classification Search .................... 349/58, 349/65, 57, 62, 64; 362/633, 634, 97.2; 257/80, 257/81, 82, 84
See application file for complete search history.

(56) References Cited

U.S. PATENT DOCUMENTS 6,835,961 B2 * 12/2004 Fukayama ...................... 257/84
7,125,157 B2 * 10/2006 Fu et al. ......................... 362/632

* cited by examiner

*Primary Examiner* — Thoi V Duong
(74) *Attorney, Agent, or Firm* — Birch, Stewart, Kolasch & Birch, LLP (57) ABSTRACT

A backlight unit that minimizes damage to an optical sheet due to external impacts, and a liquid crystal display employing the backlight unit are disclosed. The backlight unit comprises a light source unit comprising a plurality of light sources; a bottom cover that receives the light source unit and comprises a first protrusion; support sides fastened to both opened shorter sides of the bottom cover to support the light source unit and comprising a second protrusion; and an optical sheet unit disposed on the light source unit and comprising a first long hole in which the first protrusion is inserted and a second long hole in which the second protrusion is inserted, wherein the first and second long holes have a dumbbell shape in which the diameter of a curved portion is larger than the width of a linear portion through which the first and second protrusions pass.

10 Claims, 8 Drawing Sheets

FIG. 1

(Related Art)

FIG. 2

(Related Art)

(Related Art)

BACKLIGHT UNIT AND LIQUID CRYSTAL DISPLAY USING THE SAME

This nonprovisional application claims priority under 35 U.S.C. §119(a) on Patent Application No. 10-2008-0014196 filed in Republic of Korea on Feb. 15, 2008 the entire contents of which are hereby incorporated by reference.

BACKGROUND

1. Field

This document relates to a backlight unit and, more particularly, to a backlight unit that minimizes damage to an optical sheet due to external impacts, and a liquid crystal display employing the same.

2. Related Art

In general, currently, an application coverage of a liquid crystal display (LCD) extends thanks to its characteristics that it is lighter, thinner, and driven at a low power consumption. Thus, the LCD is being commonly applied to office automation equipment, audio/video equipment, or the like. The LCD displays a desired image on its screen by controlling the amount of transmission of light beams according to a video signal applied to a plurality of control switches arranged in a matrix form.

Because the LCD is not a self-emissive display device, it requires a light source such as a backlight. The backlight unit for the LCD is divided into a direct type backlight unit and an edge type backlight unit. The edge type backlight unit is configured such that a light source is disposed at an outer side of a flat panel and light from the light source is made incident to the entire surface of a liquid crystal panel by using a transparent light guide plate. The direct type backlight unit is configured such that a light source is disposed on a rear surface of the liquid crystal panel to directly illuminate the entire surface of the liquid crystal panel. Compared with the edge type backlight unit, the direct type backlight unit is advantageous in that it can use a plurality of light sources to enhance the luminance and widen a light emission surface. An LCD TV, for which a large-scale liquid crystal panel is required, commonly employs the direct type backlight unit.

Figure 1:
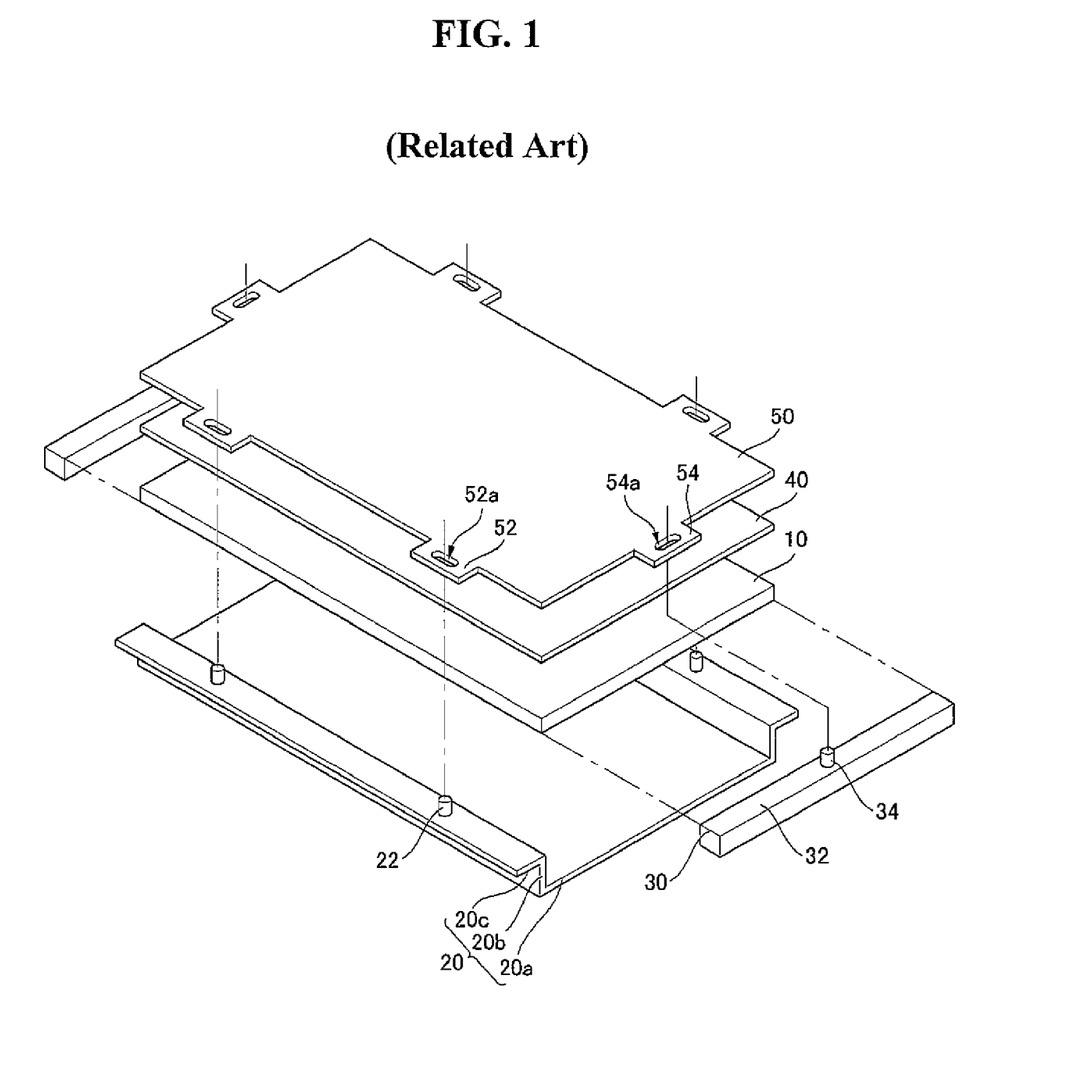
FIG. 1 is an exploded perspective view of a direct type backlight unit according to the related art.
Figure 2:
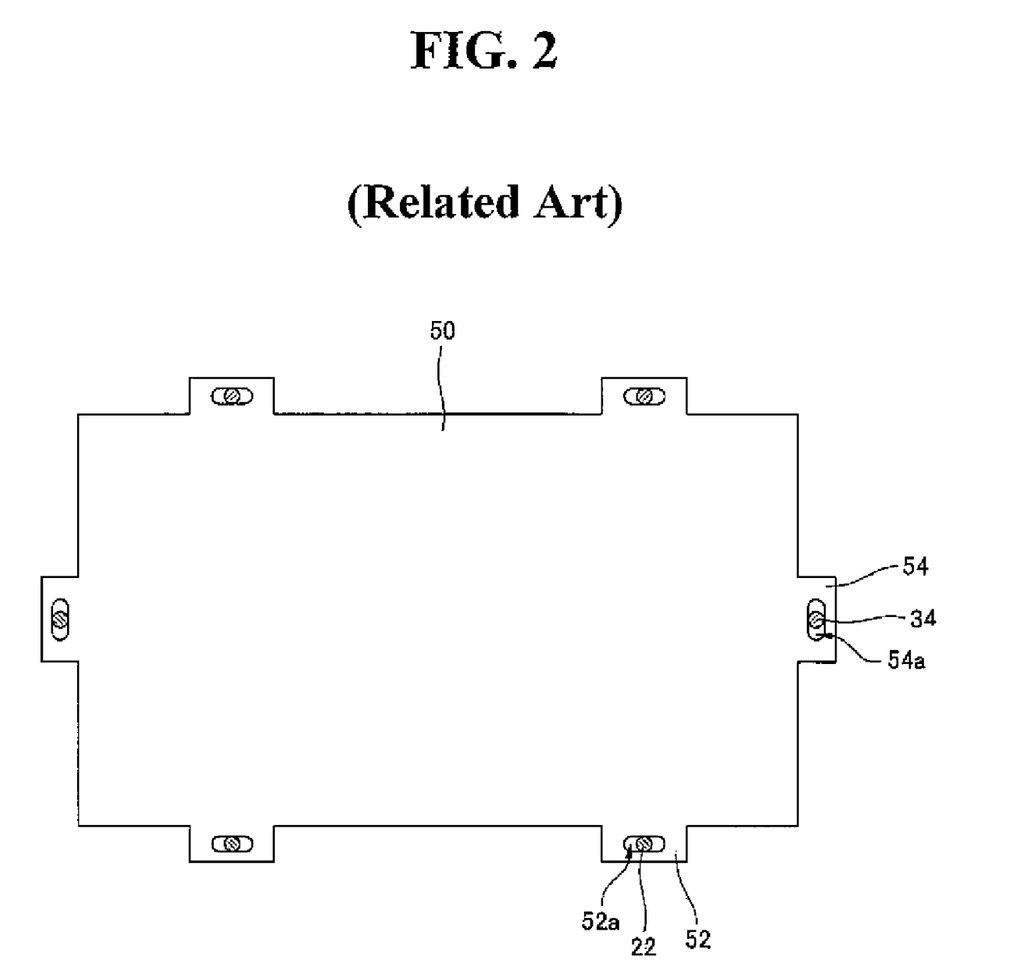
FIG. 2 is a drawing illustrating a state that optical sheets are fixed on upper faces of a bottom cover and support sides according to the related art.

With reference to FIGS. 1 and 2, the direct type backlight unit comprises a light source unit 10 to emit light to the liquid crystal panel, a bottom cover 20 to receive the light source unit 10, support sides 30 installed at both slope faces of the bottom cover 20 and supporting the light source unit 10, and a diffuser 40 and optical sheets sequentially stacked on the light source unit 10.

The bottom cover 20 includes a bottom surface 20a, slope faces 20b extending from the bottom surface 20a in one direction and facing each other, and upper faces 20c extending from the slope faces 20b in one direction and allowing the diffuser 40 and the optical sheets 50 to be stacked thereon. First protrusions 22 are formed on the upper faces 20c of the bottom cover 20 to prevent wobbling of the diffuser 40 and the optical sheets 50 and guide them. Second protrusions 34 are formed on the upper faces 32 of the support sides 30 to also prevent wobbling of the diffuser 40 and the optical sheets 50 and guide them.

The diffuser 40 diffuses light, which is made incident from the light source unit 10, toward a front side of the liquid crystal panel to thereby make a distribution density of light emitted to the liquid crystal panel uniform. The diffuser 40 is guided by the first and second protrusions 22 and 34 so as to be disposed on the upper faces 20c of the bottom cover 20 and the upper faces 32 of the support sides 30.

The optical sheets 50 are to make light, which has been diffused by the diffuser 40, proceed to be perpendicular to the liquid crystal panel to thus enhance light efficiency. The optical sheets 50 comprise one or more diffusion sheets and one or more prism sheets. Further, the optical sheets 50 comprise first ear portions 52 each with a long hole 52a and second ear portions 54 each with a long hole 54a so as to be fixed on the upper faces 20c of the bottom cover 20 and the upper faces 32 of the support sides 30. The first long holes 52a of the first ear portions 52 are fastened with the first protrusions 22 formed on the upper faces 20c of the bottom cover 20, while the second long holes 54a of the second ear portions 54 are fastened with the second protrusions 34 formed on the upper faces 32 of the support sides 30. Here, the first and second long holes 52a and 54a contact with the first and second protrusions 22 and 34 in a point contact manner or with a quite narrow contact area.

Figure 3A:
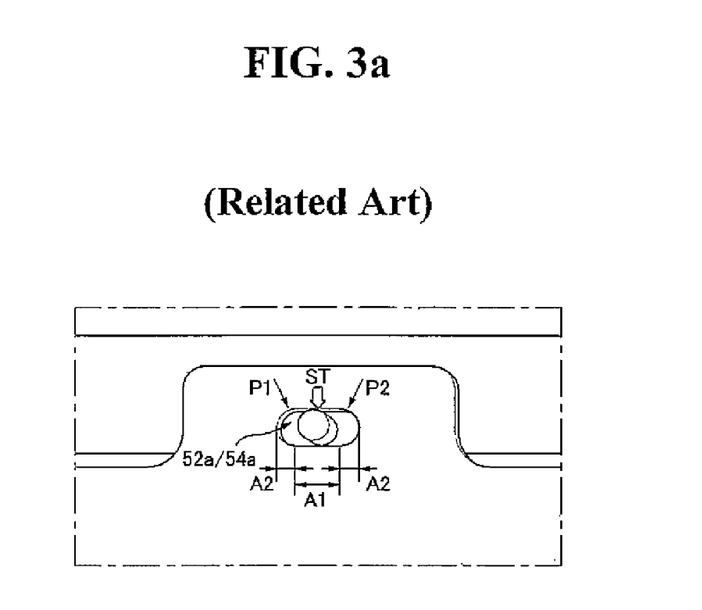
FIG. 3a is a drawing illustrating a phenomenon that stress concentration is generated due to external impacts.
Figure 3B:
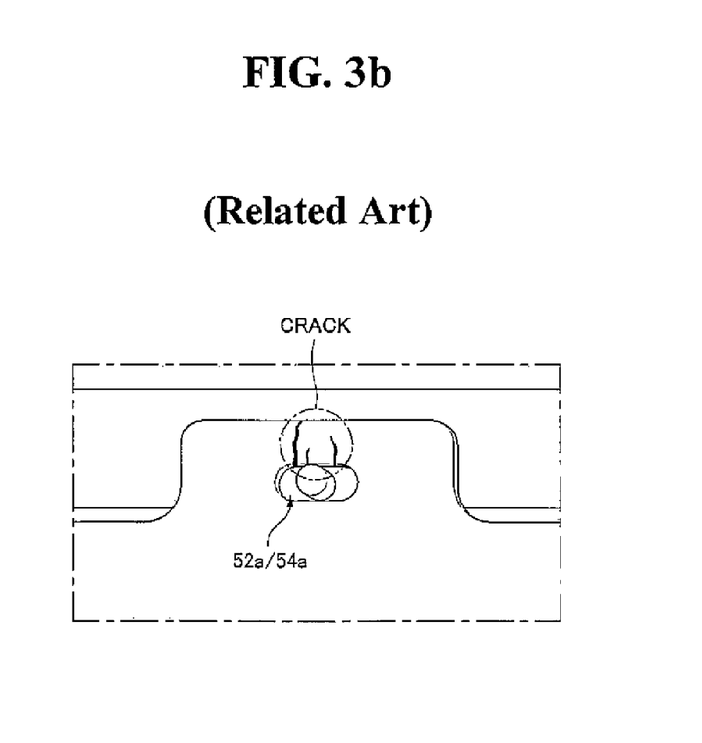
FIG. 3b is a drawing illustrating a phenomenon that a particular portion of optical sheets are damaged (cracked) due to the stress concentration.

As for the LCD having such a backlight unit, if an impact ST is applied from the exterior while the LCD is being transported, the impact ST causes a stress concentration at a point Pi where a linear portion A1 and a curved portion A2 of the first long hole or the second long hole 52a or 54a meet as shown in FIG. 3a. The stress concentration results in a crack at the particular point P1 of the optical sheets 50 as shown in FIG. 3b. The crack generated at the long holes 52a and 54a of the optical sheets 50 hinders the optical sheets 50 from being properly fixed on the upper faces 20c of the bottom cover 20 and on the upper faces 32 of the support sides 30, making them wobble, which results in that debris (particles) generated when the crack was made are introduced to the liquid crystal panel to degrade display quality.

SUMMARY

One aspect of this document is to provide a backlight unit that minimizes damage to an optical sheet due to external impacts, and a liquid crystal display (LCD) employing the same.

Another aspect of this document is to provide a backlight unit capable of preventing degradation of display quality possibly caused as an optical sheet is cracked, and an LCD employing the same.

In an aspect, a backlight unit comprises a light source unit having a plurality of light sources; a bottom cover that receiving the light source unit and having a first protrusion; support sides fastened to both opened shorter sides of the bottom cover to support the light source unit and having a second protrusion; and an optical sheet unit disposed on the light source unit and having a first long hole in which the first protrusion is inserted and a second long hole in which the second protrusion is inserted, wherein the first and second long holes have a dumbbell shape in which the diameter of a curved portion is larger than the width of a linear portion through which the first and second protrusions pass.

The first protrusion may be formed on an upper face of the bottom cover facing the optical sheet unit, the second protrusion may be formed on an upper face of the support side facing the optical sheet unit, and the first and second protrusions may have a cylindrical shape or a polygonal column shape.

The first long hole may be formed at a first ear portion provided at a longer side of the optical sheet unit, and the second hole may be formed at a second ear portion provided at a short side of the optical sheet unit.

The optical sheet unit may have such a structure that one or more diffusion sheets and one or more prism sheets are stacked, and the first and second ear portions are provided on each of the diffusion sheets and the prism sheets.

The optical sheet unit may have such a structure that one or more diffusion sheets and one or more prism sheets are stacked, and the first and second ear portions are provided at the uppermost one of the stacked sheets.

In another aspect, a liquid crystal display comprise: a backlight unit comprising a light source unit having a plurality of light sources, a bottom cover receiving the light source unit and having a first protrusion, support sides fastened to both opened shorter sides of the bottom cover to support the light source unit and having a second protrusion, and an optical sheet unit disposed on the light source unit and having a first long hole in which the first protrusion is inserted and a second long hole in which the second protrusion is inserted; and a liquid crystal panel to display an image by using light made incident from the backlight unit, wherein the first and second long holes have a dumbbell shape in which the diameter of a curved portion is larger than the width of a linear portion through which the first and second protrusions pass.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, exemplary embodiments of the present invention will now be described with reference to the accompanying drawings.

Figure 4:
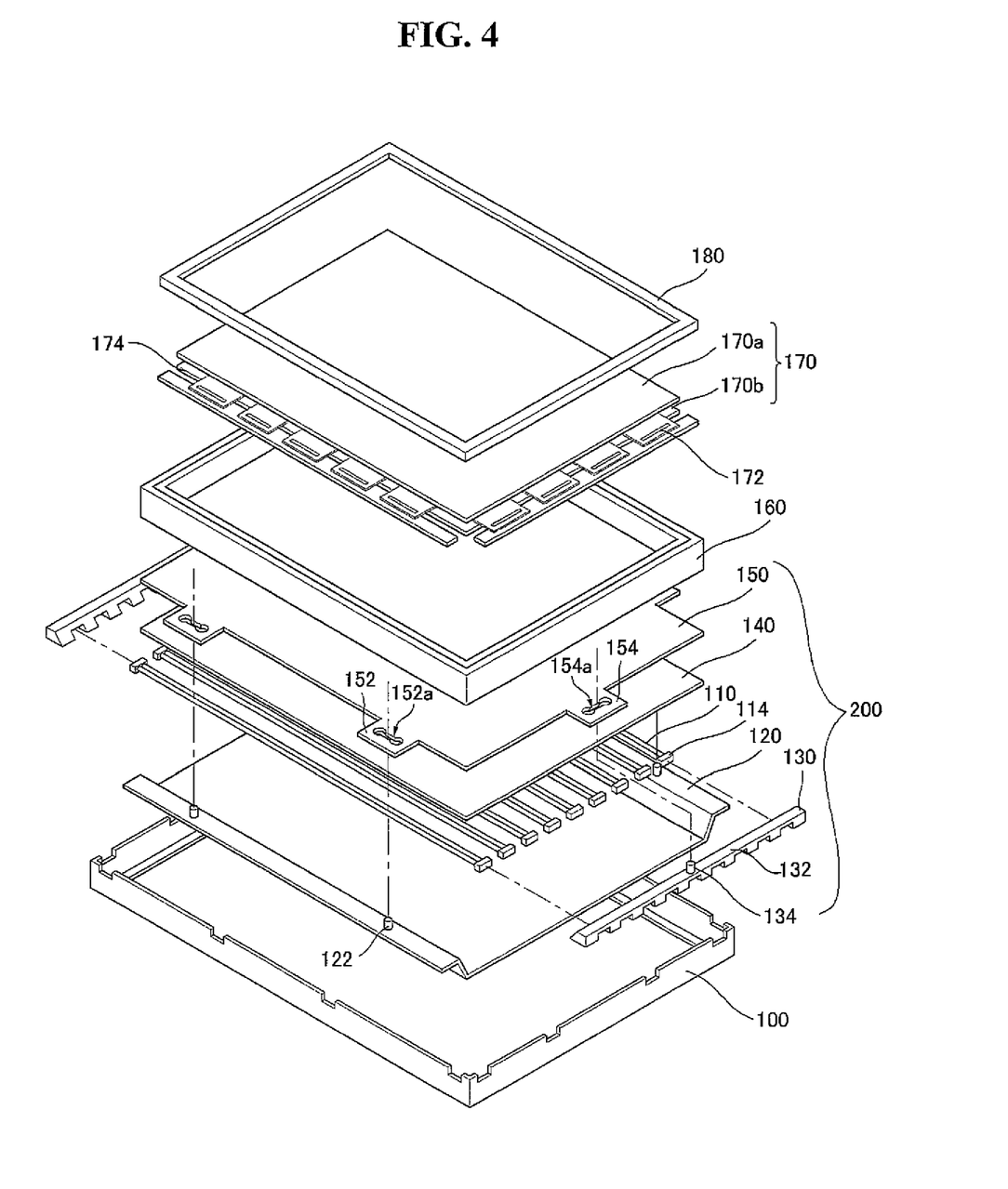
FIG. 4 is an exploded perspective view of a liquid crystal display (LCD) according to an exemplary embodiment of the present invention.
Figure 5:
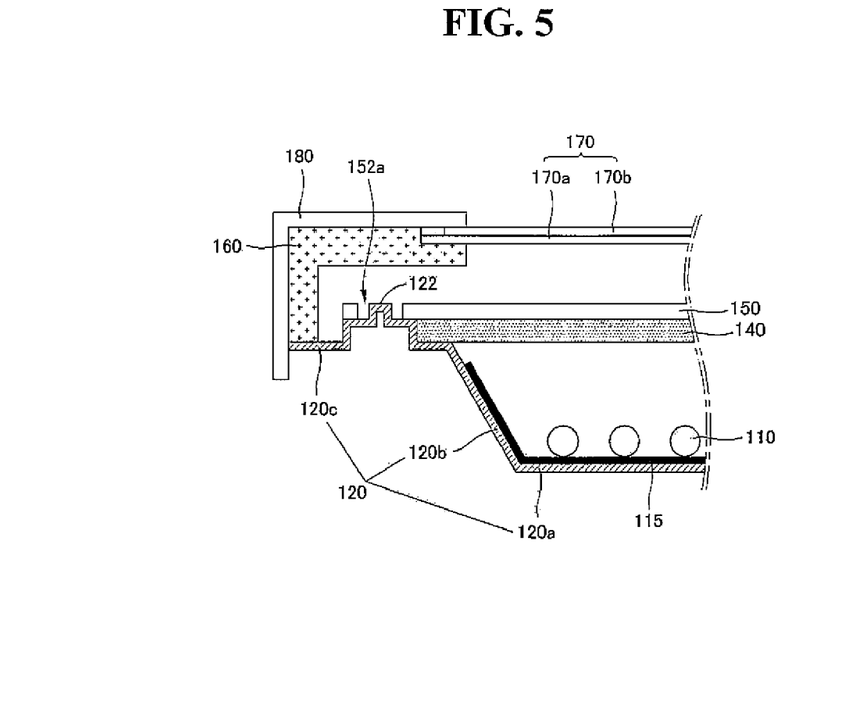
FIG. 5 is a sectional view of a portion of the LCD in FIG. 4 in an assembled state.
Figure 6:
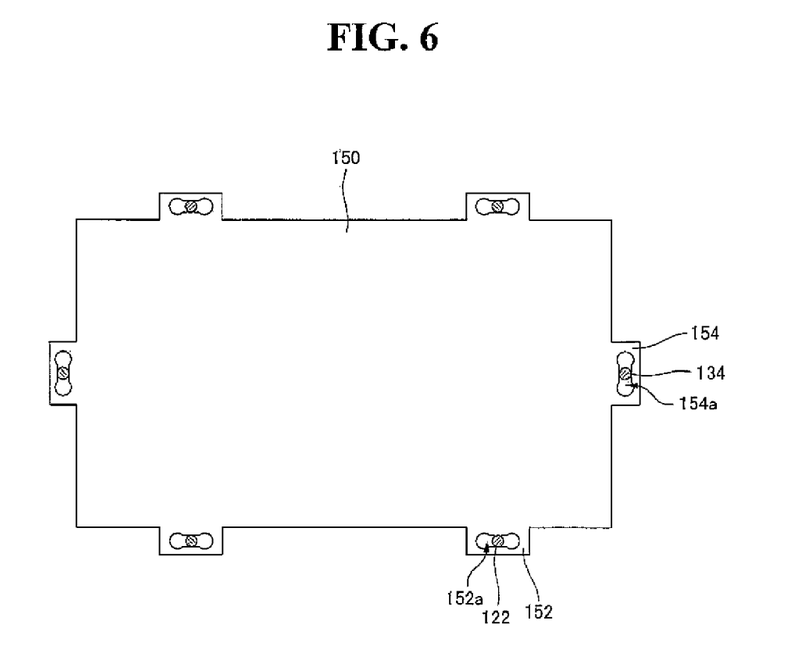
FIG. 6 is a drawing illustrating a state that optical sheets are fixed on upper faces of a bottom cover and support sides according to an exemplary embodiment of the present invention.

FIG. 4 is an exploded perspective view of a liquid crystal display (LCD) according to an exemplary embodiment of the present invention, FIG. 5 is a sectional view of a portion of the LCD in FIG. 4 in an assembled state, and FIG. 6 is a drawing illustrating a state that optical sheets are fixed on upper faces of a bottom cover and support sides according to an exemplary embodiment of the present invention.

With reference to FIGS. 4 and 5, a liquid crystal display (LCD) according to an exemplary embodiment of the present invention comprises a support main 100, a backlight unit 200 and a liquid crystal panel 170 stacked in the support main 100, and a top case 180 to cover the edges of the liquid crystal panel 170 and slope faces of the support main 100.

The top case 180 is fabricated to have a rectangular band shape with a slope face portion and a plane portion bent at a right angle. The top case 180 is configured to cover the edges of the liquid crystal panel 170 and a panel guide 160.

The support main 100, a mold product, comprises an internal side wall face molded as a step face, on which the backlight unit 200 and the liquid crystal panel 170 are stacked.

The liquid crystal panel 170 comprises a color filter array substrate 170a and a thin film transistor (TFT) array substrate 170b. Liquid crystal cells are arranged in an active matrix form between the color filter array substrate 170a and the TFT array substrate 170b, and TFTs are installed in each liquid crystal to switch video signals. As the refractive index of each liquid crystal cell varies according to video signals, an image corresponding to the video signals is displayed on the liquid crystal panel 170. A gate tape carrier package 172, on which a gate IC (Integrated Circuit) is mounted to generate gate signals, and a data tape carrier package 174, on which a data IC is mounted to generate data signals, are attached on the TFT array substrate 170b of the liquid crystal panel 170.

The panel guide 160 comprises a rectangular frame covering a slope face of the liquid crystal panel and a mounting portion extending with a certain length from an inner wall of the rectangular frame to allow the liquid crystal panel 170 to be mounted thereon. The panel guide 160 is stacked on the support main 100 to support the liquid crystal panel 170.

The backlight unit 200 comprises a plurality of lamps 110 to emit light to the liquid crystal panel 170, a plurality of lamp holders 114 connected with both ends of the respective lamps 110, a bottom cover 120 disposed on a rear surface of the plurality of lamps 110 and receiving the plurality of lamps 110 and the plurality of lamp holders 114, support sides 130 installed at both open sides of the bottom cover 120 to support the plurality of lamps 110, a diffuser 140 positioned on the plurality of lamps, and optical sheets 150 placed on the diffuser 140.

As the lamps 110, a CCFL (Cold Cathode Fluorescent Lamp) or an external electrode type fluorescent lamp may be used. Each lamp 110 comprises a glass tube, inert gases present within the glass tub, and a cathode and an anode installed at both end portions of the glass tube. The glass tube is filled with inert gases, and phosphor is coated on the inner wall of the glass tube. The lamps 110 are fixed by lamp guides (not shown) so as to be disposed on the bottom cover 120. Meanwhile, besides the lamps 110, an LED (Light Emitting Diode) array or a hybrid array comprising both an LED and a lamp may be also used as the backlight. The plurality of lamp holders 114 are connected with the edges of the plurality of lamps to fix and support the lamps 110.

The diffuser 140 diffuses light, which is made incident from the lamps 110, toward the front side of the liquid crystal panel, to thereby make a distribution density of light emitted to the liquid crystal panel uniform. The diffuser 140 is guided by first and second protrusions 122 and 134 and disposed on upper faces 120c of the bottom cover 120 and on upper faces 132 of the support sides 130. The diffuser 140 may be made of PMMA (Polymethylmeth Acrylate) or glass so as to be prevented from being deformed by heat generated from the lamps 110.

Figure 7A:
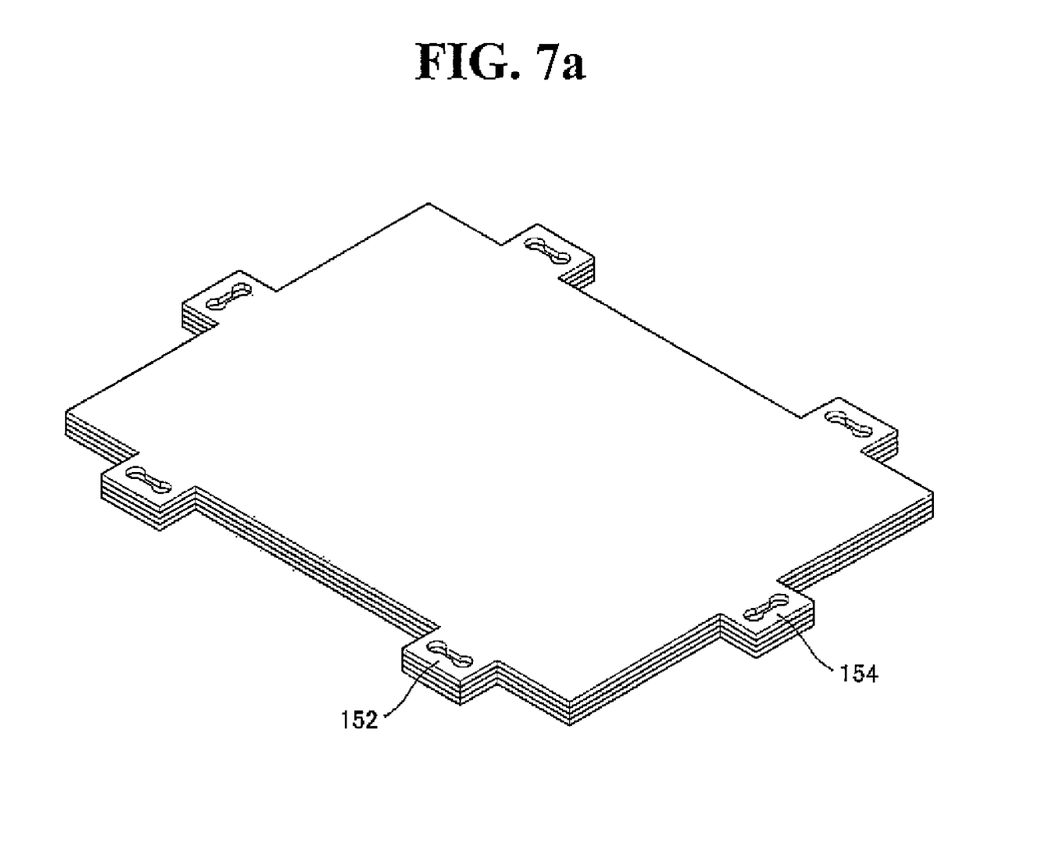
FIG. 7a is a drawing illustrating one example of the configuration of first and second ear portions.
Figure 7B:
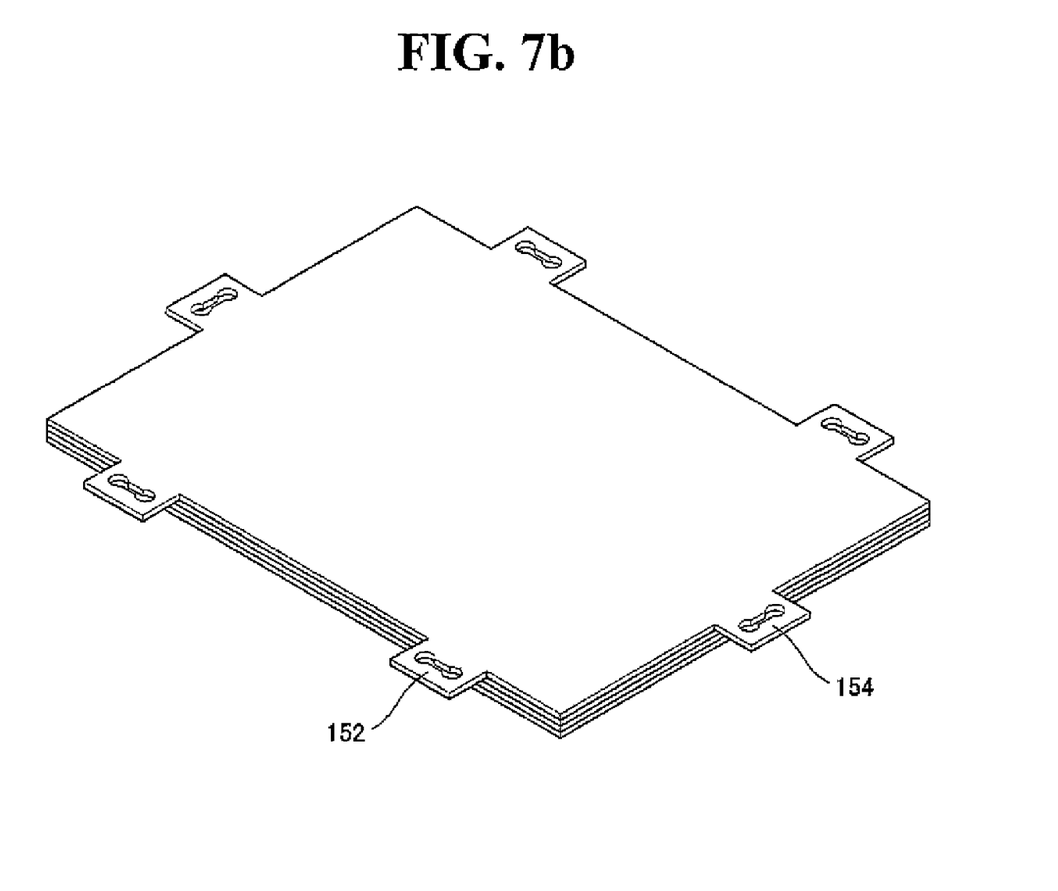
FIG. 7b is a drawing illustrating another example of the configuration of the first and second ear portions.

The optical sheets 150 serve to make light, which has been diffused by the diffuser 140, proceed to be perpendicular to the liquid crystal panel to thus increase light efficiency. The optical sheets 150 may comprise two diffusion sheets and two prism sheets. The optical sheets 150 comprise first ear portions 152 each with a first long hole 152a in a dumbbell shape and second ear portions 154 each with a second long hole 154a in a dumbbell shape, so as to be fixed on the upper faces 120c of the bottom cover 120 and the upper faces 132 of the support sides 130. The first ear portions 152 are provided at the longer side of the optical sheets 150, while the second ear portions 154 are provided at the shorter side of the optical sheets 150. As shown in FIG. C, the first long holes 152a in the dumbbell shape formed on the first ear portions 152 are fastened with the first protrusions 122 formed on the upper faces 120c of the bottom cover 120, and the second long holes 154a in the dumbbell shape formed on the second ear portions 154 are fastened with the second protrusions 134 formed on the upper faces 132 of the support sides 130. Here, the reason for forming the first and second long holes 152a and 154a in the dumbbell shape is to reduce or remove a stress concentration possibly caused by external impacts. This will be described in detail with reference to FIG. 8. The optical sheets 150 are made of a PET (PolyethyleneTerephthalate) material. The first and second ear portions 152 and 154 may be formed at each of the optical sheets as shown in FIG. 7a, or may be formed only at an uppermost optical sheet disposed to be closest to the liquid crystal panel as shown in FIG. 7b. If the first and second ear portions 152 and 154 are formed at each of the optical sheets 150 as shown in FIG. 7a, the optical sheets 150 may be more firmly fixed relatively, while the fabrication and assembling process of the optical sheets are disadvantageously complicated. If the first and second ear portions 152 and 154 are formed only at the uppermost optical sheet as shown in FIG. 7b, the fabrication and assembling process of the optical sheets can be simplified, but the optical sheets cannot be firmly fixed relatively.

The bottom cover 120 are disposed on the rear surface of the plurality of lamps 110 to receive and support the plurality of lamps 110 and the plurality of lamp holders 114. The bottom cover 120 comprises a bottom surface 120a, slope faces 120b extending from the bottom surface 120a in one direction and facing each other, and upper faces 120c extending from the slope faces 120b in one direction to allow the diffuser 140 and the optical sheets 150 to be stacked and fixed thereon. The slope faces 120b and the upper faces 120c are formed only at both longer sides of the bottom cover 120, and are not formed at both shorter sides of the bottom cover 120. Both shorter sides of the bottom cover 120 are open. The first protrusions 122 are formed on the upper faces 120c of the bottom cover 120 to prevent the diffuser 140 and the optical sheets 150 from wobbling and guide the diffuser 140 and the optical sheets 150. The first protrusions 122 may be formed to have a cylindrical shape or a polygonal column shape such as a triangular column shape or a square column shape. A reflection sheet 115 is attached on the bottom surface 120a and the slope faces 120b of the bottom cover 120. The reflection sheet 115 is made of a material that reflects light, and attached to the bottom surface 120a and the slope faces 120b of the bottom cover 120 by means of a double-sided adhesive tape. The reflection sheet 115 reflects light, which proceeds to the bottom cover 120 from the plurality of lamps 110, toward the liquid crystal panel 170 to thus improve the efficiency of light emitted to the liquid crystal panel 170.

The support sides 130 comprise a concavo-convex portion (a depressed and protruded pattern) in which the plurality of lamp holders 114 are inserted, and is combined with both shorter sides of the bottom cover 120. The second guide protrusions 134 are formed on the upper faces 132 of the support sides 130 in order to prevent the diffuser 140 and the optical sheets 150 from wobbling and guide the diffuser 140 and the optical sheets 150. The second protrusions 134 may have a cylindrical shape or a polygonal column shape such as a triangular column shape or a square column shape. The support sides 130 support the plurality of lamps 110 the diffuser 140, and the optical sheets 150, and reflect light, which proceeds to the both shorter sides of the bottom cover 120 from the plurality of lamps 110, toward the liquid crystal panel 170 to thus enhance the efficiency of light emitted to the liquid crystal panel 170.

Figure 8:
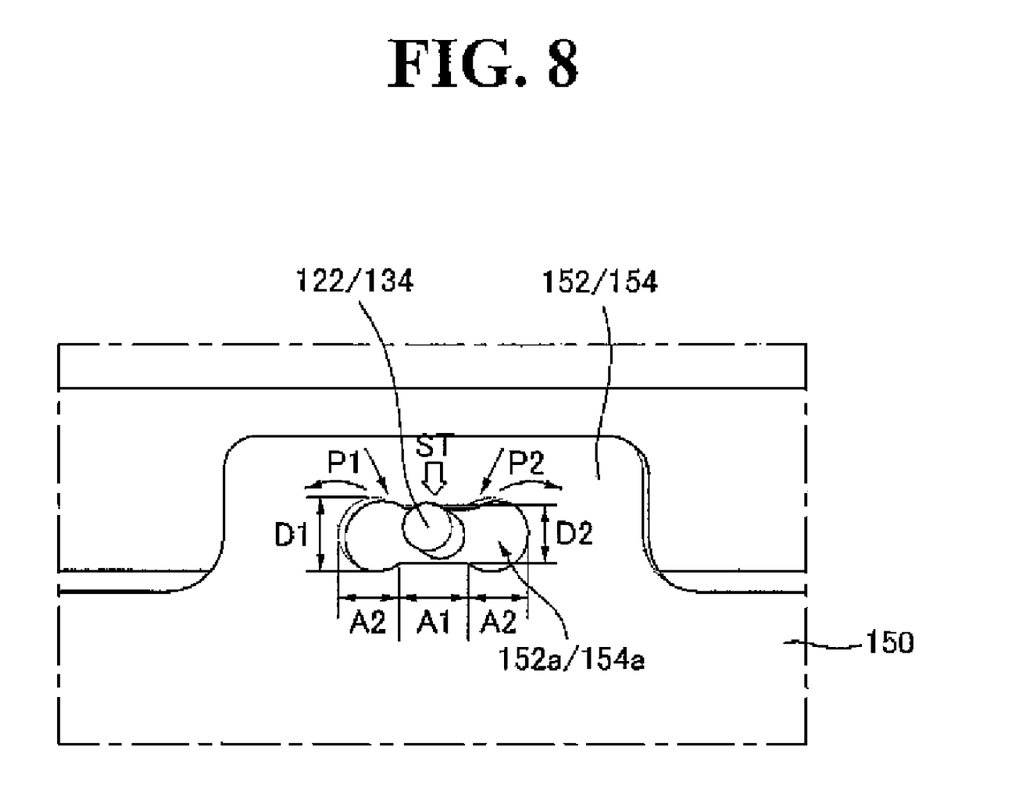
FIG. 8 is a drawing illustrating a reduction or removal of a stress concentration due to external impacts.

FIG. 8 is a drawing illustrating a reduction or removal of a stress concentration due to external impacts.

With reference to FIG. 8, the long holes 152a and 154a in the dumbbell shape are formed on the ear portions 152 and 154 of the optical sheets 150 such that the diameter D1 of curved portions A2 is larger than the width D2 of the linear portion A1 according to the exemplary embodiment of the present invention. Accordingly, even if an impact ST is applied from the exterior while being transported, a stress concentration that may be possibly formed at a point P2 where the linear portion A1 and the curved portion A2 of the long holes 152a and 154a meet can be considerably reduced. This is because the stress concentration point generated by the external impact ST is distributed to the entire points of the curved portion A2 of the long holes 152a and 154a from the point P2 where the linear portion A1 an the curved portion A2 meet. The curved portion A2 of the long holes 152a and 154a has the diameter larger than that of the related art, thus increasing the effect of distributing the concentration point of the stress. Thus, the optical sheets 150 according to the exemplary embodiment of the present invention cannot be easily damaged (cracked) by external impacts, owing to such effect of distributing the concentration point of the stress.

As described above, the backlight unit and the LCD employing the same according to the exemplary embodiments of the present invention have the advantages that because the optical sheets have the long holes in the dumbbell shape in which the diameter of the curved portion is larger than the width of the linear potion, the stress concentration point with respect to an external force can be distributed, whereby damage to the optical sheets possibly caused by external impacts during transportation can be drastically reduced. Therefore, the backlight unit and the LCD employing the same according to the exemplary embodiment of the present invention can prevent degradation of display quality caused by the cracking phenomenon of the optical sheets.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A backlight unit comprising:
a light source unit having a plurality of light sources;
a bottom cover receiving the light source unit and having a first protrusion;
support sides fastened to both opened shorter sides of the bottom cover to support the light source unit and having a second protrusion; and
an optical sheet unit disposed on the light source unit and having a first long hole in which the first protrusion is inserted and a second long hole in which the second protrusion is inserted, wherein the first and second long holes have a dumbbell shape in which the diameter of a curved portion is larger than the width of a linear portion through which the first and second protrusions pass.

2. The backlight unit of claim 1, wherein the first protrusion is formed on an upper face of the bottom cover facing the optical sheet unit, the second protrusion is formed on an upper face of the support side facing the optical sheet unit, and the first and second protrusions have a cylindrical shape or a polygonal column shape.

3. The backlight unit of claim 1, wherein the first long hole is formed at a first ear portion provided at a longer side of the optical sheet unit, and the second hole is formed at a second ear portion provided at a short side of the optical sheet unit.

4. The backlight unit of claim 3, wherein the optical sheet unit has such a structure that one or more diffusion sheets and one or more prism sheets are stacked, and the first and second ear portions are provided on each of the diffusion sheets and the prism sheets.

5. The backlight unit of claim 3, wherein the optical sheet unit has such a structure that one or more diffusion sheets and one or more prism sheets are stacked, and the first and second ear portions are provided at the uppermost one of the stacked sheets.

6. A liquid crystal display device comprising:
a backlight unit comprising a light source unit having a plurality of light sources, a bottom cover receiving the light source unit and having a first protrusion, support sides fastened to both opened shorter sides of the bottom cover to support the light source unit and having a second protrusion, and an optical sheet unit disposed on the light source unit and having a first long hole in which the first protrusion is inserted and a second long hole in which the second protrusion is inserted; and
a liquid crystal panel to display an image by using light made incident from the backlight unit,
wherein the first and second long holes have a dumbbell shape in which the diameter of a curved portion is larger than the width of a linear portion through which the first and second protrusions pass.

7. The device of claim 6, wherein the first protrusion is formed on an upper face of the bottom cover facing the optical sheet unit, the second protrusion is formed on an upper face of the support side facing the optical sheet unit, and the first and second protrusions have a cylindrical shape or a polygonal column shape.

8. The device of claim 6, wherein the first long hole is formed at a first ear portion provided at a longer side of the optical sheet unit, and the second hole is formed at a second ear portion provided at a short side of the optical sheet unit.

9. The device of claim 8, wherein the optical sheet unit has such a structure that one or more diffusion sheets and one or more prism sheets are stacked, and the first and second ear portions are provided on each of the diffusion sheets and the prism sheets.

10. The device of claim 8, wherein the optical sheet unit has such a structure that one or more diffusion sheets and one or more prism sheets are stacked, and the first and second ear portions are provided at the uppermost one of the stacked sheets.

* * * * *